United States Patent [19]
Getz et al.

[11] 3,906,341
[45] Sept. 16, 1975

[54] FAULT DETECTOR FOR IGNITER TESTING USING HIGH FREQUENCY NOISE

[75] Inventors: Edward H. Getz, St. Joseph; Clifford L. DeSchaaf, Stevensville, both of Mich.

[73] Assignee: Whirlpool Corporation, Benton Harbor, Mich.

[22] Filed: Apr. 25, 1974

[21] Appl. No.: 463,962

[52] U.S. Cl. .................. 324/62; 324/51; 324/57 N; 340/253 R
[51] Int. Cl.² ........................................ G01R 27/02
[58] Field of Search ...................... 324/62, 51, 57 N; 340/253 R, 253 Q, 253 Z

[56] References Cited
UNITED STATES PATENTS

| | | | |
|---|---|---|---|
| 3,284,707 | 11/1966 | Clinton | 324/62 |
| 3,319,160 | 5/1967 | Wood et al. | 324/51 X |
| 3,612,993 | 10/1971 | Tims et al. | 324/62 X |

*Primary Examiner*—Stanley T. Krawczewicz
*Attorney, Agent, or Firm*—Hill, Gross, Simpson, Van Santen, Steadman, Chiara & Simpson

[57] ABSTRACT

A method and apparatus for detecting faults in electrical resistance type igniters, particularly igniters of silicon carbide or the like, employs techniques wherein an operational voltage is applied to the igniter to cause the generation of high frequency noise by a defective igniter. The high frequency noise is passed through a high pass filter and applied to an amplifier, and the amplified noise is presented to a signal level detector in the form of a comparator circuit. The comparator circuit is provided with a reference level to desensitize the comparator circuit with respect to signals other than high frequency noise, and the output of the comparator circuit is received by a memory circuit. The memory circuit, in turn, controls an alarm circuit which emits a signal to indicate a faulty condition of the igniter under test.

19 Claims, 4 Drawing Figures

3,906,341

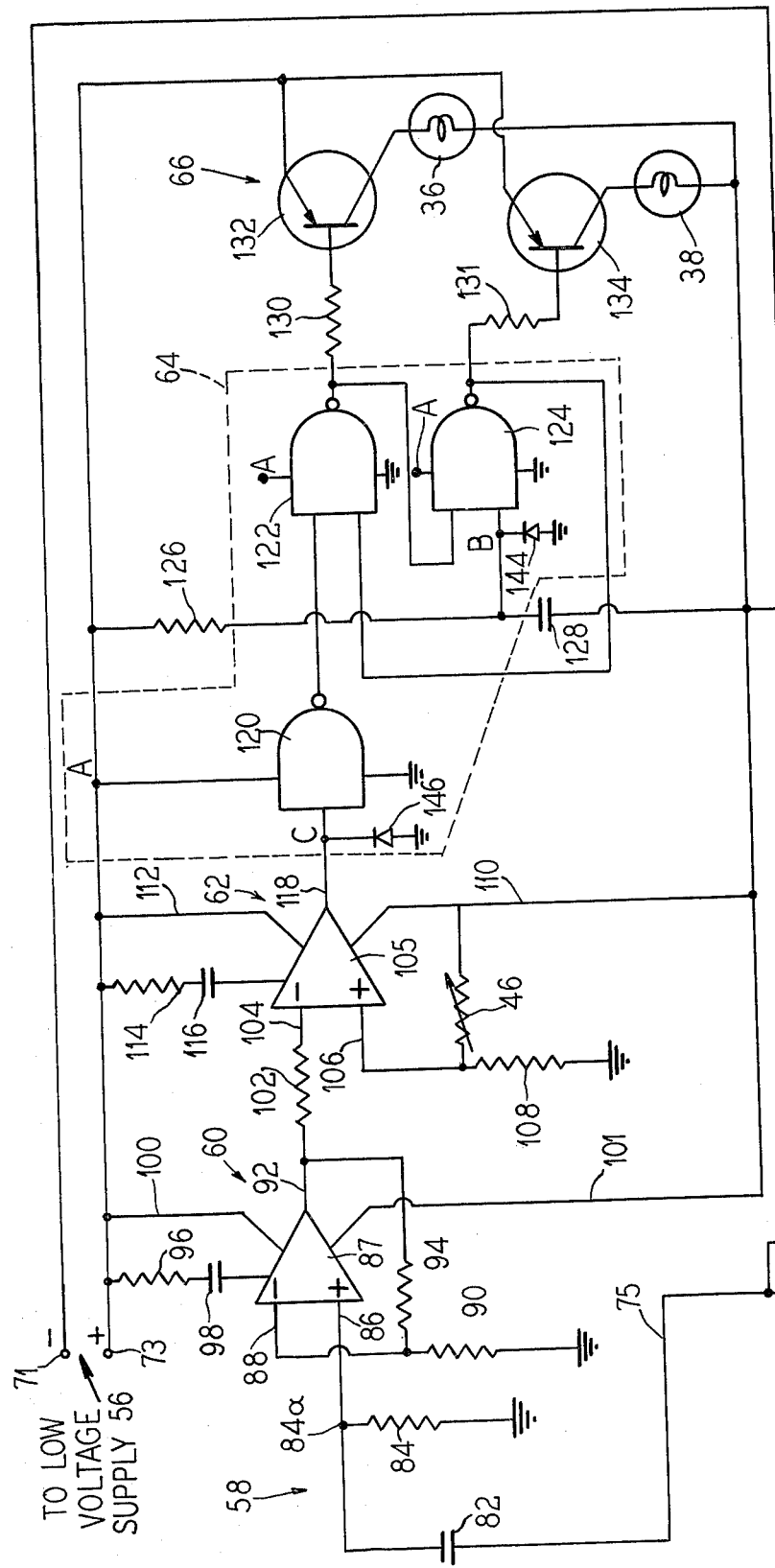
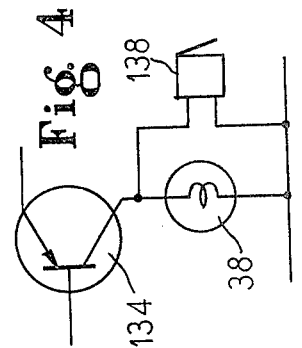
Fig. 4
Fig. 3

FAULT DETECTOR FOR IGNITER TESTING USING HIGH FREQUENCY NOISE

CROSS REFERENCE TO RELATED APPLICATION

This application is related to a United States patent application entitled, "Improved Fault Detector for Igniter Testing" assigned to the assignee of the present invention and filed on even date herewith. The inventor in the related application is John Richard Pfouts, and that application has been identified by U.S. Pat. application Ser. No. 463,963 filed Apr. 25, 1974.

BACKGROUND OF THE INVENTION

1. Field of the Invention

This invention relates to resistance testing techniques, and more particularly to techniques for testing an electrical resistance type igniter which may be employed as a pilot for igniting the fuel for a gas burner.

2. Description of the Prior Art

Burner units have long utilized an electrical resistance type ignition element in an electrical ignition system, and such ignition systems have been applied to clothes dryers. Many gas dryers use an igniter which, for example, may be of the type disclosed in U.S. Pat. No. 3,372,305 granted Mar. 5, 1968, made of silicon carbide or like material which is generally very fragile. Consequently, a serious problem encountered in utilizing such igniters in a clothes dryer is the large number of damaged or defective or faulty igniters appearing in newly manufactured appliances. This quality control problem is compounded by the fact that a cracked, or otherwise damaged or defective, igniter may perform normally for short initial periods of dryer operation and its faulty condition may go undetected during initial tests performed prior to crating and shipping of the dryer. However, in many instances such a faulty igniter will fail soon after the dryer has been installed for home use. Therefore, it is highly desirable to provide a reliable, relatively inexpensive, and easy-to-use test technique, including test method and apparatus, for detecting defective igniters so as to permit their timely replacement.

The article "Noise-Performance In Tin Oxide Resistors," by J. G. Curtis which appeared in the Nov. 10, 1961 issue of the periodical "Electronics" discloses the phenomenon of noise generation by substandard resistors, and the utilization of that noise to detect certain types of defects in film resistors.

U.S. Pat. No. 3,727,133 discloses noise measurement as an indication of a defect in a tested device, such as a DC generator.

The detection of X-rays is utilized in a testing technique in U.S. Pat. No. 3,761,720 to determine faults in a Van de Graaff generator.

U.S. Pat. No. 3,102,231 discloses a noise testing technique in which white noise is supplied to a system under test to provide a response which is indicative of the status of the tested system.

Other publications concerning the utilization of noise testing and detection techniques may be of interest and include the article "Noise Voltage Measurement in Low Impedance Elements," which appeared in the May 28, 1958 issue of the periodical "Electronic Design" and U.S. Pat. No. 2,820,945.

SUMMARY OF THE INVENTION

The primary object of the invention, as indicated above, is to provide a new and improved method and apparatus for testing electrical resistance type igniters for operational defects.

A more specific object of the invention is to provide inexpensive, reliable and easy to use techniques for testing such igniters.

According to the invention, an igniter is connected through test circuit apparatus to an operational voltage. When mounted in its operating position on a burner, the igniter may also be connected in circuit with the gas valves of the burner in a manner such as illustrated by Alvin J. Elders in his U.S. Pat. No. 3,597,139, issued Aug. 3, 1971 and assigned to Whirlpool Corporation. The inclusion of the gas burner circuitry in the test circuit does not interfere with the operation of the fault detection apparatus, as will be appreciated from the detailed description below.

Upon energization by an operational voltage, for example, that available from a commercial 120 volt, alternating current (AC), 60 Hz source, a defective igniter produces noise of a higher frequency than the operational voltage, and this higher frequency noise (referred to herein as high frequency noise) together with the operational voltage noise is sampled by a test circuit. The high frequency noise is then separated from the operational voltage wave by a high pass filter, amplified and fed to a signal level detector. The signal level detector comprises a comparator circuit which compares the level of the amplified high frequency noise signal with a reference level. When the noise level is above the reference level, the comparator circuit provides output pulses which are fed to a memory circuit.

The memory circuit supplies current to a driver which energizes a "green" indicator lamp when the noise level is below the reference level and supplies current to a driver which energizes a "red" indicator lamp when the noise level is above the reference level.

The fault detector is provided with a low voltage power supply and a preset circuit is connected to the memory circuit to ensure operation of the green indicator lamp initially when the low voltage power supply is turned on.

As indicated above, cracks or other defects or faults in silicon carbide igniters or igniters of a like material are difficult to detect by visual observation; however, defective igniters respond to the application of operational voltages by generating high frequency noise. Several theories have been proposed as to the cause of this phenomenon, including noise generation due to arcing or corona discharge, but none of these theories have been substantiated. Nevertheless, the method and apparatus disclosed herein fulfill the objects of the invention and provide an accurate test of the operational integrity of an igniter.

BRIEF DESCRIPTION OF THE DRAWINGS

Other objects, features and advantages of the invention, its organization, construction, and operation will be best understood from the following detailed description of embodiments of the invention taken in conjunction with the drawings, of which:

FIG. 3 is a schematic circuit diagram of the circuit illustrated in block form in FIG. 2;

FIG. 4 is a schematic diagram of a portion of the apparatus circuit illustrated in FIG. 3, particularly showing the addition of an audible alarm device, such as a buzzer.

DESCRIPTION OF THE PREFERRED EMBODIMENT

Figure 1:
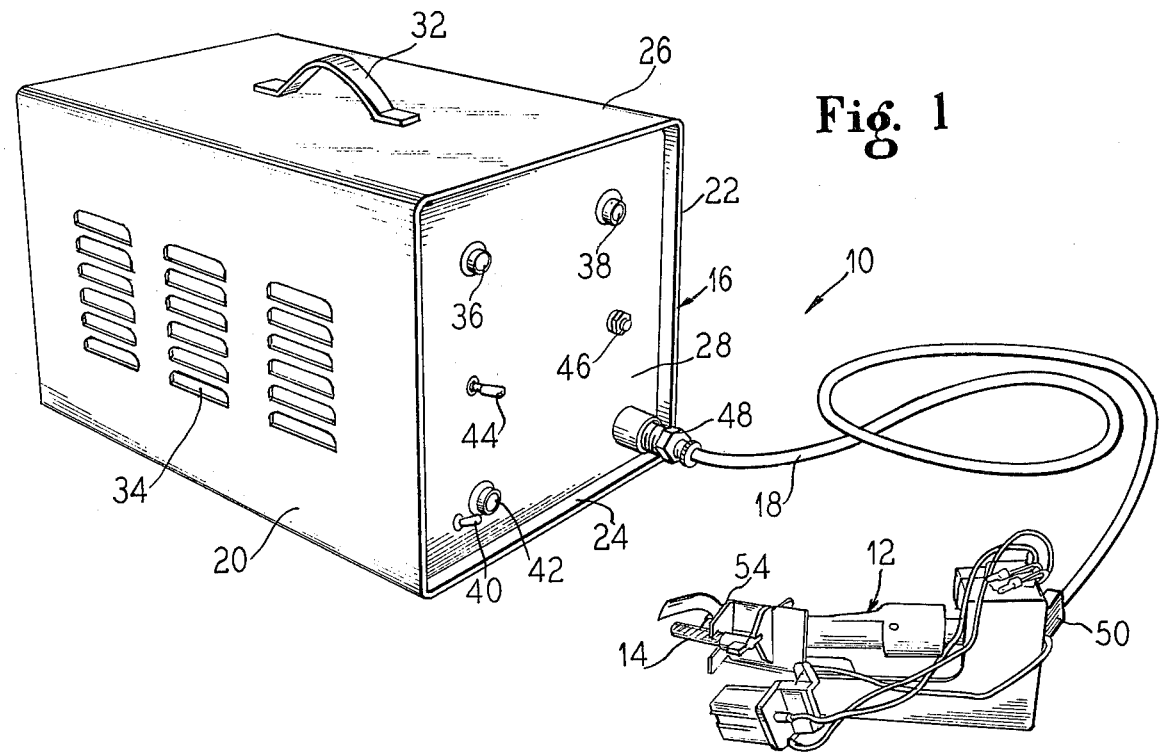
FIG. 1 is a pictorial representation of an igniter fault detector connected to a gas burner component of a clothes dryer not shown.

Referring in FIG. 1, a test set up for testing on igniter is generally illustrated at 10. A clothes dryer gas burner component assembly 12, such as disclosed in the aforementioned Elders U.S. Pat. No. 3,597,139, having an electrical resistance igniter 14 to be tested is connected to test equipment 16 by way of a cable 18. It should be noted here that the presence of the gas burner circuitry in the test circuit with the igniter has no effect on the test; and that the harness or cable 18 may include connections to the terminals of the gas burner assembly, or may simply provide connections directly to the igniter 14. As shown, the cable 18 is adapted for connection to the gas burner terminals at a quick release connector 50. Although not illustrated in the drawing, the gas burner assembly 12 may be mounted within the housing of the dryer prior to testing of the igniter and remains in the dryer during actual testing of the igniter.

The test unit or equipment 16 comprises a case, which may be of metal, having a pair of sidewalls 20 and 22, a bottom wall 24, a top wall 26, a front wall or console 28 and a rear wall (not shown) through which an electrical supply cord (not shown) may extend for connection to a commercial power supply, such as a 120 VAC 60 Hz supply.

As illustrated in the drawing, the test unit 16 may be provided with a carrying handle 32 attached to the top wall 26, and the sidewalls 20 and 22 may be provided with cooling louvers as illustrated at 34.

The front console 28 includes a "green" indicator lamp 36 for indicating a defect-free or sound igniter, a "red" indicator lamp 38 for indicating a defective or otherwise faulty igniter, a power-on/off switch 40 and a corresponding indicator lamp 42, a test switch 44, and access to an adjustable potentiometer 46, as will be understood from the description which follows.

Figure 2:
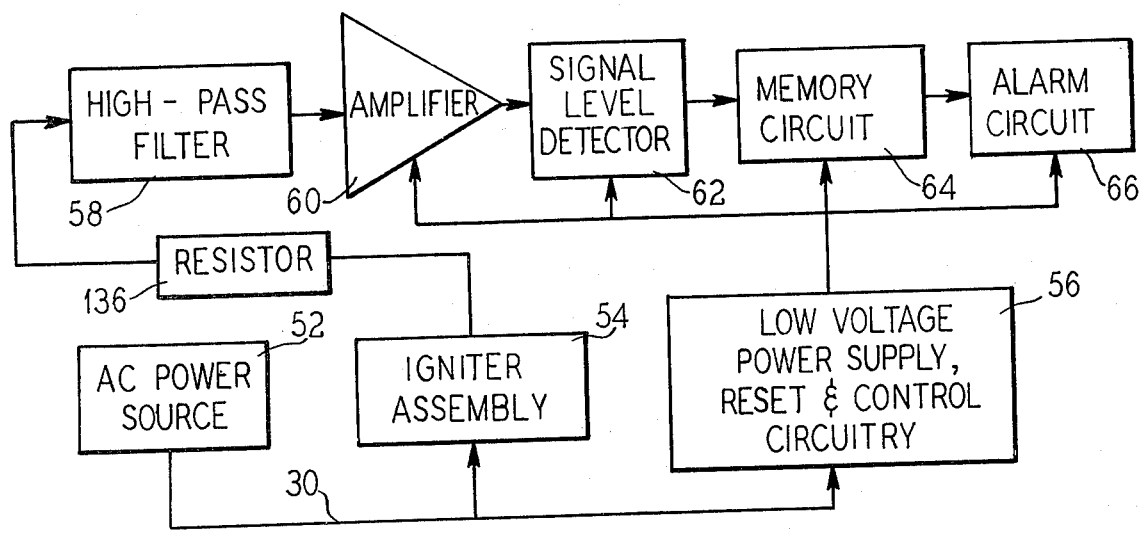
FIG. 2 is a schematic block diagram of the test apparatus of the present invention and also serves as a flow diagram for the method of the present invention.

As shown in FIG. 1, the cable 18 is connected to the test unit 16 by a connector 48 and is connected to the igniter 14, or to the igniter and the gas burner circuitry, by a connector 50 as will be well understood by those skilled in the art. Referring to FIG. 2, an alternating current (AC) power source 52 is schematically illustrated as being connected by a power cord 30 to an igniter assembly 54, which may be installed in a gas burner assembly, and to a low voltage power supply 56. The low voltage power supply may be a source of controlled voltage derived from or actuated by the source 52; or may be, for example, a direct current (DC) voltage source such as a pair of batteries. In the latter case the low voltage source would, of course, be independent from AC power source 52. In any event, such low voltage sources are well known in the art and will not be treated in further detail herein.

The igniter assembly 54 holds the igniter 14 to be tested, and includes electrical terminals providing an electrical connection between the igniter 14 and the AC power source. The igniter 14 is electrically connected, via igniter assembly 54, to a resistor 136 for picking off or sampling the high frequency noise signal emitted by a faulty igniter under test; and, as shown in FIG. 3, the resistor 136 is electrically connected to the high pass filter 58.

Upon the application of an operational voltage to a defective igniter the igniter will generate high frequency noise which is received by signal detecting means including the high pass filter 58 as indicated above. The high pass filter 58 (FIGS. 2 and 3) includes a capacitor 82 and a resistor 84 and separates the high frequency noise from the 60 Hz line frequency and passes the high frequency noise signal to an amplification means 60 and a level detector 62 both of which are also included in the signal detecting means. The capacitor 82 also serves to protect the test circuitry from damage due to voltage or current overload.

The signal level detector 62 as shown in FIG. 3 is a comparator circuit which includes means for providing an adjustable reference level to desensitize the circuit to signals below the reference level. Thus a sensitivity adjustment is provided for the test equipment to minimize the rejection of igniters which are free from defects such as to be satisfactory for use with a gas burner.

The comparator circuit or signal level detector 62 is connected to signal means including an alarm circuit and a memory circuit 64. The memory circuit is conditioned to a first state in response to detection by the comparator circuit of a noise level above the reference level and to a second state in response to detection by the comparator circuit of a noise level which is below the reference level. The memory circuit 64 is connected to an alarm circuit or lamp and driver circuit 66 which includes a pair of driver transistors and indicator means as, for example, a pair of corresponding lamps (36 and 38 in FIG. 1) for indicating the operational condition of an igniter undergoing test. The memory circuit and drivers together constitute switching means for controlling the response of the lamps.

Referring to FIG. 3, a schematic circuit diagram of a preferred embodiment of the invention is illustrated in which an igniter assembly 54 including an igniter 14 undergoing test is shown connected to an alternating current power source 52 by way of a pair of conductors 70 and 72 and a test switch 44. A capacitor 68 is connected across the conductors 70 and 72 as a filter, or a partial filter, for removing line noise from the commercial supply waveform. The power-on/off switch and the corresponding indicator lamp have not been illustrated in detail since one skilled in the art would readily appreciate the connection of these elements. Upon placing the power switch 40 in the "on" position, a controlled low voltage power supply is made available and applied to the test circuit at the terminals 71 and 73 in preparation for a test. Also, closing of the switch 40 provides power to the test switch 44.

Upon closing of the test switch 44, an operational voltage is applied to the igniter under test and, if the igniter is faulty, high frequency noise will be generated by the igniter.

A resistor 136 is connected in series with the igniter by way of a conductor 74 and by way of the power supply conductor 72. The resistor 136 serves to pick off or sample the high frequency noise generated by the igniter and present this sampling to the high pass filter 58 which, as indicated above, comprises a capacitor 82 and a resistor 84 and which is effective to separate the high frequency noise generated by a faulty igniter from the 60 Hz line frequency.

The high pass filter 58, in particular the junction between the capacitor 82 and the resistor 84, is connected to the amplification means 60. More specifically, the junction 84a is connected to the non-inverting input 86 of an operational amplifier 87. The inverting input 88 of the operational amplifier 87 is connected to ground by way of a resistor 90 and to the output 92 of the operational amplifier by way of a resistor 94. A negative potential is supplied to the operational amplifier 87 by way of a conductor 101 and a positive potential is supplied to the operational amplifier 87 by way of a conductor 100. A resistor 96 and a capacitor 98 are employed to frequency compensate the operational amplifier 87, a technique well known to those skilled in the art. The amplification means 60 amplifies the high frequency noise received by way of the high pass filter 58 and has its output 92 connected to the inverting input 104 of an operational amplifier 105 by way of a resistor 102. The operational amplifier 105 receives a negative potential by way of a conductor 110 and a positive potential by way of a conductor 112, and a resistor 114 and a capacitor 116 are employed to frequency compensate the operational amplifier 105 in the same manner as was done with the operational amplifier 87.

A variable voltage divider comprising the potentiometer 46 and a resistor 108 are connected between the negative supply conductor 110 and ground and includes a junction connected to the non-inverting input 106 of the amplifier 105. This variable voltage divider provides a reference level to the amplifier 105 and functions to desensitize the circuit with respect to signals below the reference level. If the signal level at the input 104 is below the reference level at the input 106 the comparison provided by the amplifier 105 results in a first output signal at the output 118 of the operational amplifier 105, and when the signal level at the input 104 is above the reference level at the input 106 a second signal is provided at the output 118.

The output 118 is connected to an inverter 120 in the form of a NAND gate which inverts the output signal of the operational amplifier 105 and presents the inverted signal to a NAND gate 122 which is one of a pair of NAND gates 122 and 124 cross coupled as is well known in the art. All three NAND gates 120, 122 and 124 are powered at junction A from the low voltage power supply 56, and the gates are protected from exposure to potentially damaging voltages which exceed the capacity of the gates by the grounded diodes 144 and 146 electrically connected to gate inputs at junctions B and C respectively. The NAND gates 122 and 124 comprise what is known in the art as a latching circuit.

An inverted signal which represents a high frequency noise level below the reference level causes the memory circuit 64 to assume a state wherein the gate 122 is open and the gate 124 is closed. In this state, a driver transistor 132 having an emitter-base circuit including a resistor 130, is forward biased and rendered conductive to energize the "green" indicator lamp 36. The memory circuit is responsive to inverted signals of the opposite character (where the high frequency noise level is above the reference level) to open the gate 124 and close the gate 122, thereby effecting a forward bias on a driver transistor 134 which has its base connected to the gate 124 by way of a resistor 131 to energize the "red" indicator lamp 38 to indicate a defective igniter.

As indicated in FIG. 2, the low voltage power supply block 56 includes a preset circuit. In FIG. 3, this preset circuit is illustrated as comprising a resistor 126 and a capacitor 128 connected to series across the low voltage supply lines and having the junction between the resistor and the capacitor connected to an input of the gate 124. Upon application of low voltage potentials to the terminals 71 and 73, the negative potential shift at this junction causes the memory circuit 64 to assume the first-mentioned state wherein the lamp 36 is energized.

Referring to FIG. 4, it may be advantageous in certain applications to utilize an audible alarm in conjunction with, or in place of, the indicator lamp 38. In FIG. 4, a buzzer 138 is electrically connected in parallel relationship with the lamp 38 to operate and provide an audible alarm in response to detection of a high frequency noise level by the test equipment above the reference level.

In addition to the aforementioned component specifications, the following table sets forth component values and designations which were found to provide accurate fault detection.

| Reference Character | Value, Designation |
|---|---|
| 46 | 100 K pot |
| 52 | 115–120 VAC, 60 Hz |
| 56 | ± 6 VDC Power Source |
| 68 | 2 µf. |
| 82, 98, 116 | 0.001 µf. |
| 84 | 39 K |
| 87, 105 | Operational Amplifier MC 1435 |
| 90, 102 | 47 K |
| 96, 114 | 150 ohm |
| 108 | 2.2 K |
| 120, 122, 124 | DTL NAND Gates MC 846 |
| 126 | 220 K |
| 128 | 5 µf. |
| 130, 131 | 4.7 K |
| 144, 146 | IN 4002 |
| 136 | 0.1 ohm 15 watt |

Although we have described our invention by reference to particular illustrative embodiments thereof, many changes and modifications of our invention may become apparent to those skilled in the art without departing from the spirit and scope of the invention. We therefore intend to include within the patent warranted hereon all such changes and modifications as may reasonably and properly be included within the scope of our contribution to the art.

The embodiments of the invention in which an exclusive property or privilege is claimed are defined as follows:

1. A method of testing electrical resistance type igniters for defects comprising the steps of:
    applying an operating voltage to an igniter to effect the generation of noise by a faulty igniter;
    comparing the high frequency noise level with a reference level; and
    activating an alarm in response to a noise level above the reference level.

2. A method of testing electrical resistance type igniters according to claim 1, comprising the steps of:

filtering the operating voltage; and amplifying the generated high frequency noise before comprising the level of the noise with the reference level.

3. A method of testing electrical resistance type igniters according to claim 1, comprising the step of:

activating an indicator in response to a high frequency noise level below the reference level as a positive indication of an operationally non-faulty igniter.

4. A method of testing electrical resistance type igniters for a faulty condition, comprising the steps of:

applying an operational voltage to an igniter to generate high frequency noise in the presence of a faulty igniter condition;

separating the operational voltage from the high frequency noise;

amplifying the high frequency noise; comparing the level of the amplified high frequency noise with a reference level;

actuating a first indicator when the noise level is above the reference level; and actuating a second indicator when the noise level is below the reference level.

5. Apparatus for testing electrical resistance type igniters for defects, comprising:

means connecting an igniter to an operational voltage supply to generate high frequency noise across a defective igniter;

an impedance electrically connected to the igniter to sample the high frequency noise; an amplifier;

a high pass filter connected between said impedance and said amplifier for receiving and filtering the noise for amplification;

a signal level detection means connected to said amplifier for comparing the signal level of the high frequency noise with a reference signal level and operable to provide a first signal representing an igniter which is substantially free of defects when the noise level is below the reference level and a second signal representing an operationally defective igniter when the noise level is above the reference level;

first and second indicators respectively representing defect free and defective igniters; and switch means connected between said signal level detection means and said indicators and operated by said first and second signals, respectively, to energize the respective first and second indicators.

6. Apparatus for testing electrical resistance type igniters for operational faults, comprising:

means for applying an operating voltage to an igniter to cause the generation of high frequency noise by a faulty igniter;

an impedance connected to the igniter for sampling signals developed across the igniter; filter means connected to said impedance for passing high frequency noise;

amplifying means connected to said filter means for amplifying the signal received therefrom;

signal level detector means connected to said amplifying means for desensitizing the circuit with respect to high frequency noise signals below a reference level; and signal means connected to said signal level detector means and operative to indicate a faulty igniter.

7. Apparatus according to claim 6, wherein said means for applying an operating voltage comprises a switch connected between the igniter and an electrical supply.

8. Apparatus according to claim 6, wherein said impedance comprises a resistor connected to the igniter and to said filter means.

9. Apparatus according to claim 6, wherein said signal level detector means comprises:

a comparator circuit including an operational amplifier and a variable voltage divider, with a first input to the operational amplifier connected to said amplifying means and a second input to the operational amplifier connected to said variable voltage divider, said variable voltage divider providing a reference signal level at said second input, and said comparator circuit operative to provide a first signal in response to a signal level at said first input that is below the reference level and to provide a second signal in response to a signal level at said first input that is above the reference level;

and said signal means comprises:

first and second indicators for respectively indicating non-faulty and faulty igniters; and switch means connected between said comparator circuit and said indicators, said switch means operated by said first signal to energize said first indicator and by said second signal to energize said second indicator.

10. Apparatus according to claim 9, wherein said switch means comprises:

a memory circuit connected between said comparator circuit and said indicators.

11. Apparatus according to claim 10, wherein said switch means further comprises:

means for operating said memory circuit to a state wherein said first indicator is normally energized.

12. Apparatus according to claim 10, wherein each of said indicators comprises:

a lamp; and the switch means includes a lamp driver connected between said memory circuit and said lamp.

13. Apparatus according to claim 10, wherein said second indicator comprises:

an audible alarm means connected to said switch means.

14. Apparatus for testing electrical resistance type igniters for operational defects, comprising:

means for connecting the igniter to an electrical supply for providing an operational voltage to the igniter, a defective igniter being responsive to the operational voltage to generate high frequency noise;

an impedance connected to the igniter to sample signals developed across the igniter;

a high pass filter connected to said impedance for passing high frequency noise;

an amplifier connected to said high pass filter to amplify signals passed thereby;

a comparator circuit including a first input connected to said amplifier, a second input, and a reference signal level circuit connected to said second input, said comparator circuit being operable to provide first and second signals when the signal level at said first input is above and below, respectively, the reference level;

an inverter connected to said comparator circuit to invert the first and second signals;

first and second indicating means including first and second drivers and first and second lamps connected to respective first and second drivers for identifying defective and sound igniters, respectively;

a latching circuit including a first input and first and second outputs, said first input connected to said inverter, said first and second outputs connected to said first and second drivers, respectively, said latching circuit being responsive to the inverted first and second signals to operate said first and second drivers, respectively.

15. Apparatus according to claim 14, wherein said latching circuit includes a second input, and further comprising:

a low voltage power supply connected to said latching circuit, to said inverter, and to said indicating means; and a preset circuit connected to said second input to preset said latching circuit to cause energization of said second lamp upon the application of low voltage power from said supply.

16. Apparatus according to claim 14, wherein said impedance comprises a resistor.

17. Apparatus according to claim 14, wherein said first indicating means comprises an audible alarm device connected to and operated by said first driver.

18. Apparatus for testing for a faulty connection of an electrical resistance type igniter, comprising:

means for providing power to an igniter under test to cause the generation of high frequency electrical noise by a faulty igniter;

detecting means electrically connected to said igniter for detecting the presence of high frequency electrical noise; and signal means responsive to the detecting means for indicating a faulty condition of the igniter under test.

19. The testing apparatus defined in claim 18 wherein:

the detecting means comprises filter means for passing only high frequency noise, a resistor connected between the igniter and the filter means in series relationship with the igniter and in parallel relationship with the filter means, amplification means electrically connected to the filter means for amplifying the high frequency electrical noise passed by the filter means, and comparator means electrically connected to the amplification means for providing a reference signal level, comparing the level of the amplified high frequency noise with the reference signal level, and passing only amplified high frequency noise above the reference level; and the signal means comprises switch means including a memory circuit electrically connected to the comparator means and responsive to the comparator means, and indicator means responsive to the switch means for demonstrating a faulty condition of the igniter under test.

* * * * *

UNITED STATES PATENT AND TRADEMARK OFFICE
CERTIFICATE OF CORRECTION

PATENT NO. : 3,906,341
DATED : September 16, 1975
INVENTOR(S) : Edward H. Getz and Clifford L. DeSchaaf It is certified that error appears in the above-identified patent and that said Letters Patent are hereby corrected as shown below:

Column 7, claim 2, line 3, cancel "comprising" and substitute --comparing--.

Signed and Sealed this tenth Day of February 1976

[SEAL]

Attest:

RUTH C. MASON
Attesting Officer

C. MARSHALL DANN
Commissioner of Patents and Trademarks